(12) United States Patent
Rodrigues et al.

(10) Patent No.: US 10,287,710 B2
(45) Date of Patent: May 14, 2019

(54) RADIO OPAQUE FIBERS, FILAMENTS, AND TEXTILES

(71) Applicants:Michael Bastiao Rodrigues, Tirupur (IN); Vivekananda Siddamalaigounder Krishnaswamy, Tirupur (IN); Vasanth Kumar Sundaravadivelu, Tirupur (IN); Anand Venkatachalam, Tirupur (IN)

(72) Inventors: Michael Bastiao Rodrigues, Tirupur (IN); Vivekananda Siddamalaigounder Krishnaswamy, Tirupur (IN); Vasanth Kumar Sundaravadivelu, Tirupur (IN); Anand Venkatachalam, Tirupur (IN)

(73) Assignee: CARENOW MEDICAL PRIVATE LIMITED, Coimbatore (IN)

( * ) Notice: Subject to any disclaimer, the term of this patent is extended or adjusted under 35 U.S.C. 154(b) by 552 days.

(21) Appl. No.: 14/907,403

(22) PCT Filed: Jul. 23, 2014

(86) PCT No.: PCT/IB2014/001367
§ 371 (c)(1),
(2) Date: Jan. 25, 2016

(87) PCT Pub. No.: WO2015/019141
PCT Pub. Date: Feb. 12, 2015

(65) Prior Publication Data
US 2016/0186364 A1    Jun. 30, 2016

(30) Foreign Application Priority Data
Jul. 25, 2013 (IN) .......................... 3303/CHE/2013

(51) Int. Cl.
*D01F 1/00* (2006.01)
*D01F 1/10* (2006.01)
(Continued)

(52) U.S. Cl.
CPC .......... *D01F 1/106* (2013.01); *B29C 47/0014* (2013.01); *C08K 3/22* (2013.01);
(Continued)

(58) Field of Classification Search
CPC .. D01F 1/106; D01F 8/16; D01D 5/34; D01D 5/36; B29C 47/0014; C08K 3/22;
(Continued)

(56) References Cited

U.S. PATENT DOCUMENTS 4,935,019 A * 6/1990 Papp, Jr. ................. A61L 15/18
523/117
2001/0050196 A1  12/2001 Okada et al.
(Continued)

FOREIGN PATENT DOCUMENTS

CA   2 696 648 A1   9/2011
EP   2 253 748 A1   11/2010
(Continued)

OTHER PUBLICATIONS

International Search Report and Written Opinion received in PCT Application No. PCT/IB2014/001367 dated Apr. 11, 2014.
(Continued)

*Primary Examiner* — Cephia D Toomer
(74) *Attorney, Agent, or Firm* — Brinks Gilson & Lione

(57) ABSTRACT

A radio opaque fiber, filament, and yarn is disclosed herein. The radio opaque fiber, filament, or yarn comprises a matrix (102) comprising a plurality of radio opaque material (104) and a first polymer (106), where the radio opaque material (104) is at least one of a radio opaque element, an alloy of the radio opaque element, and a compound of the radio
(Continued)

opaque element, or a combination thereof, wherein the radio opaque element if of an atomic number greater than or equal to 29, and wherein the matrix (102) forms a unified flexible structure. The radio opaque fiber, filament, or yarn further comprises a carrier polymer (108) which binds the plurality of the matrix (102) and imparts spinnability to form the fiber, filament, and yarn.

15 Claims, 7 Drawing Sheets

(51) Int. Cl.
| | | |
|---|---|---|
| *D01D 5/34* | (2006.01) | |
| *D01D 5/36* | (2006.01) | |
| *B29C 47/00* | (2006.01) | |
| *C08K 3/22* | (2006.01) | |
| *C08K 3/30* | (2006.01) | |
| *D01F 8/16* | (2006.01) | |
| *B29K 75/00* | (2006.01) | |
| *B29K 505/00* | (2006.01) | |
| *B29L 31/00* | (2006.01) | |

(52) U.S. Cl.
CPC ............... *C08K 3/30* (2013.01); *D01D 5/34* (2013.01); *D01D 5/36* (2013.01); *D01F 8/16* (2013.01); *B29K 2075/00* (2013.01); *B29K 2505/00* (2013.01); *B29L 2031/731* (2013.01); *C08K 2003/3045* (2013.01)

(58) Field of Classification Search
CPC .............. C08K 3/30; C08K 2003/3045; B29K 2078/00; B29K 2505/00; B29L 2031/731
See application file for complete search history.

(56) References Cited

U.S. PATENT DOCUMENTS

| | | | |
|---|---|---|---|
| 2006/0058867 A1* | 3/2006 | Thistle | A61B 17/12118 623/1.13 |
| 2007/0219516 A1 | 9/2007 | Patel et al. | |
| 2010/0329417 A1* | 12/2010 | Abe | D01F 1/106 378/28 |

FOREIGN PATENT DOCUMENTS

| | | |
|---|---|---|
| JP | S57-82526 A | 5/1982 |
| JP | 2006-124900 A | 5/2006 |
| JP | 2007-046181 A | 2/2007 |
| JP | 2009-215692 A | 2/2009 |
| JP | 2010-216030 | 9/2010 |
| JP | 2011-132631 A | 7/2011 |
| WO | WO 2013/023167 A1 | 2/2013 |
| WO | WO 2015/019141 A1 | 2/2015 |

OTHER PUBLICATIONS

Reporting E-mail dated Sep. 5, 2018 received from L&S International enclosing Office Action (and English translation) received in Japanese Patent Application No. JP 2016-528613 dated Jun. 5, 2018.

* cited by examiner

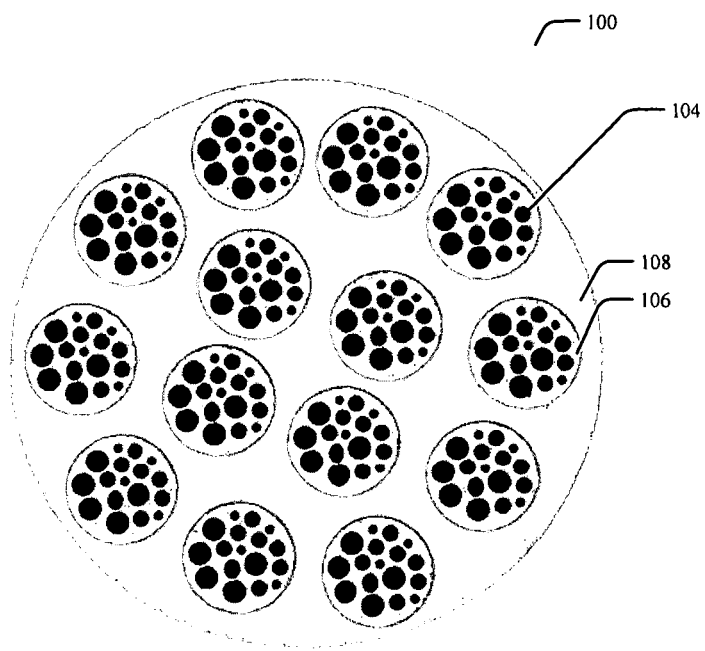
Fig. 1
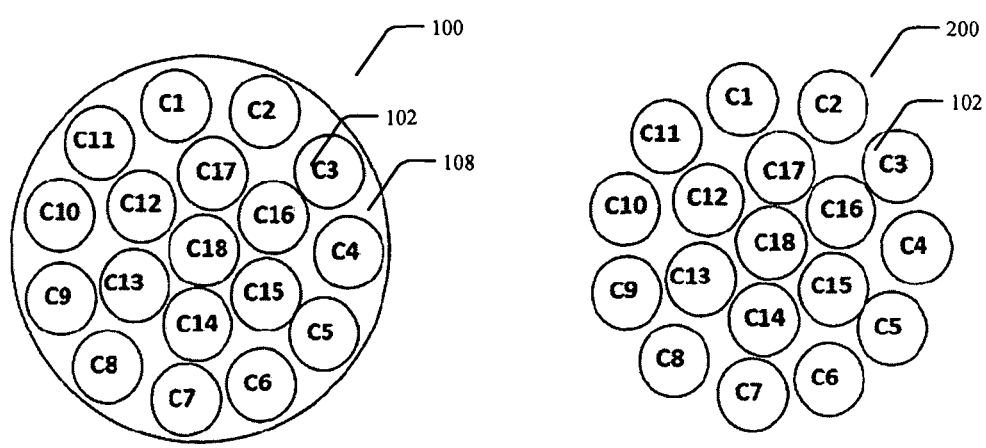
Fig. 2(a)(1)　　　Fig. 2(a)(2)

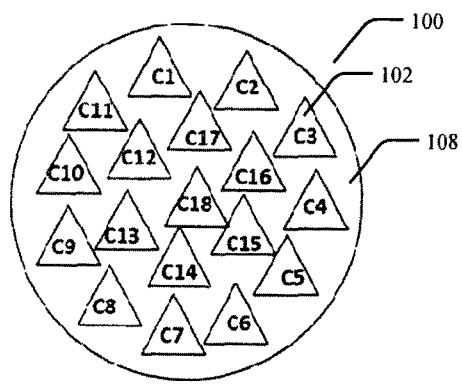
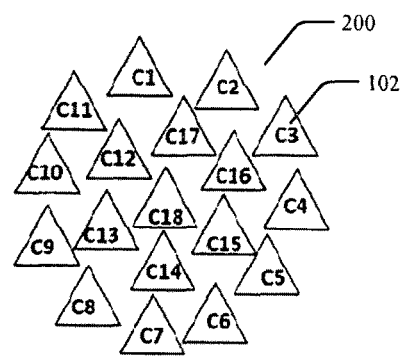
Fig. 2(b)(1)　　Fig. 2(b)(2)
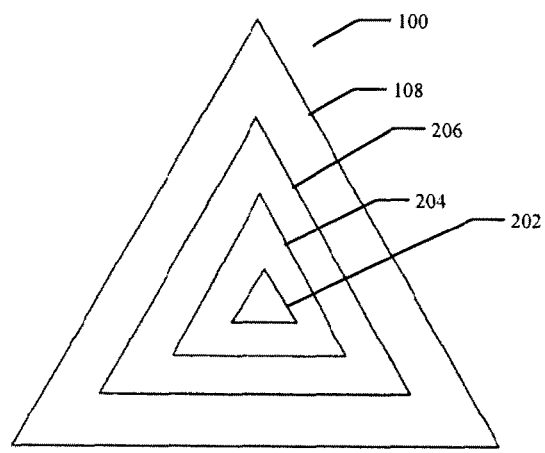
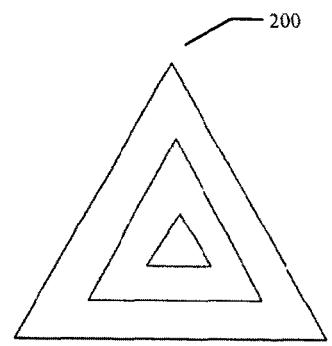
Fig. 2(c)(1)　　Fig. 2(c)(2)

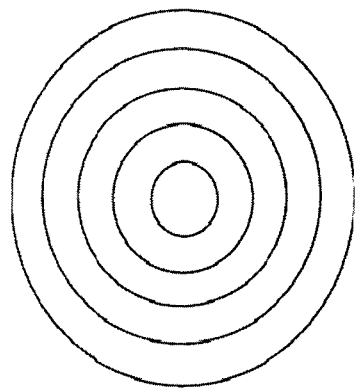
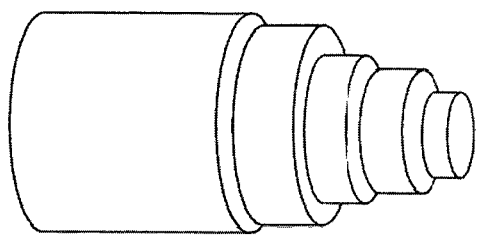
Fig. 2(d)(1)　　　Fig. 2(d)(2)
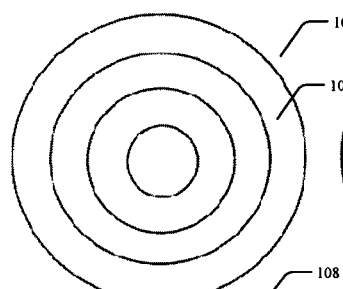
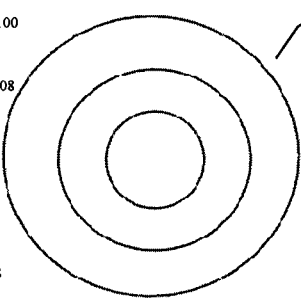
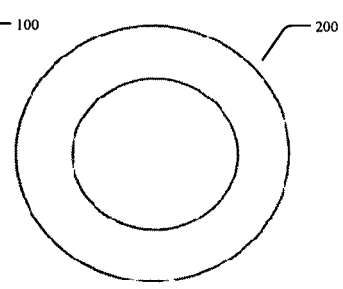
Fig. 2(e)(1)　　Fig. 2(e)(2)　　Fig.2(e)(3)
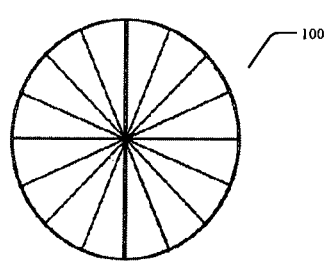
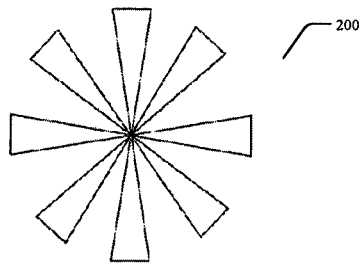
Fig. 2(f)(1)　　Fig. 2(f)(2)

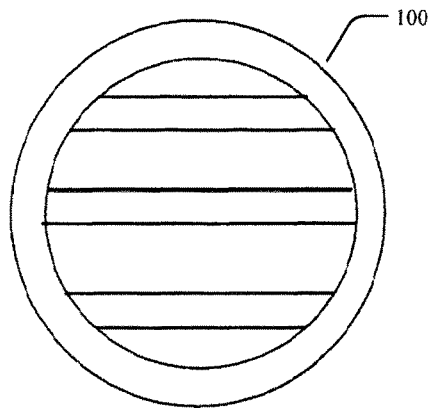
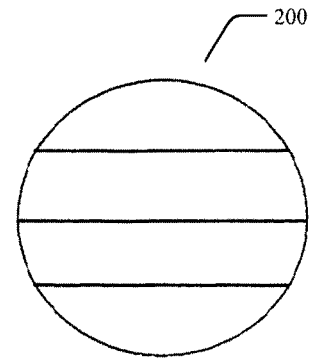
Fig.2(g)(1)　　　　　Fig. 2(g)(2)
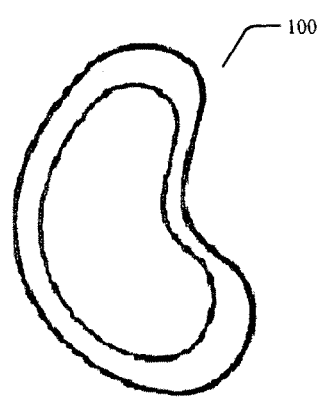
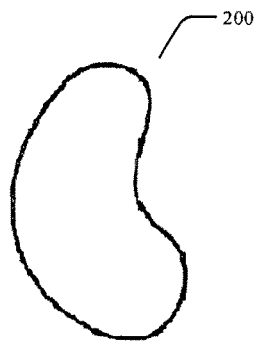
Fig.2(h)(1)　　　　　Fig. 2(h)(2)

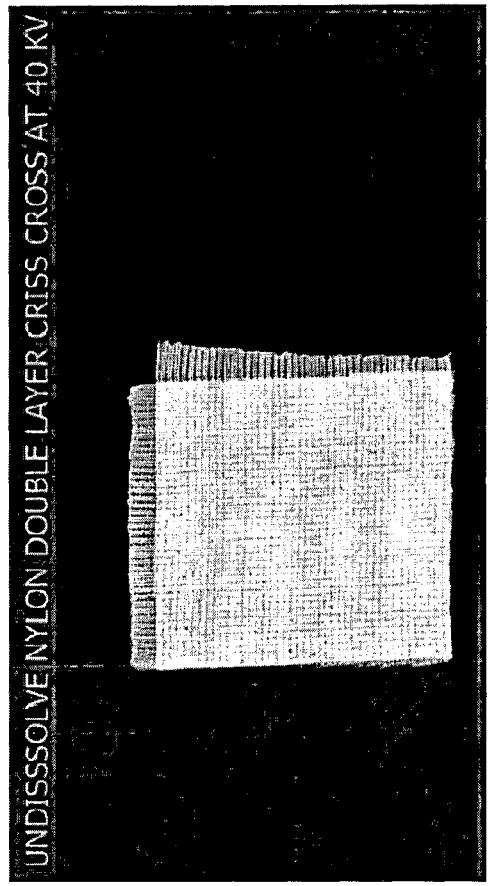
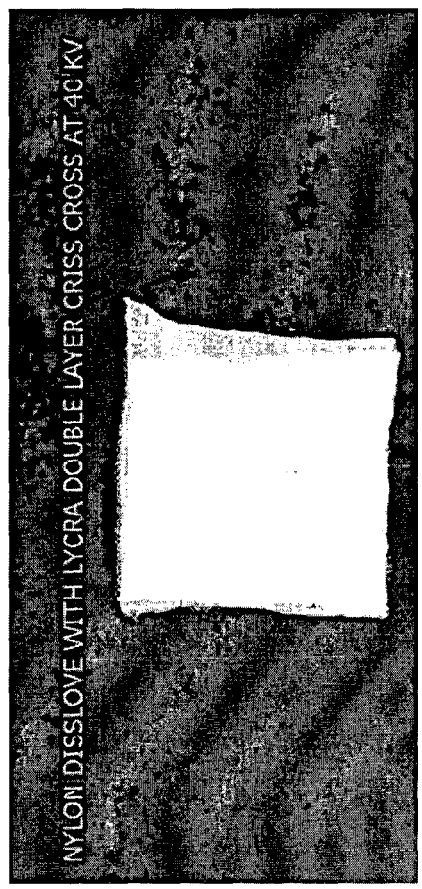
Fig. 6(a)
Fig. 6(b)

ies such as aluminum, brass or steel, upon which a layer of lead is dispersed. The lead plate is placed between the source and the administrator to shield the administrator from X-Ray incidence. The lead plate is also placed between the source and the subject to shield parts of the body of the subject that are not intended for diagnosis. However, these lead plates are heavy and non-flexible. Therefore moving and positioning the lead plate appropriately to ensure that the administrator and subject are sufficiently protected is a challenge. Additionally, exposure to lead of the lead plates by administrators is known to cause other health hazards. Further, the toxicity of lead poses a problem for manufacturers of the lead plate, because disposal of lead wastes that occurs during manufacturing, and also disposal of used and worn lead plates causes an environment threat.

RADIO OPAQUE FIBERS, FILAMENTS, AND TEXTILES

RELATED APPLICATIONS

This application is a 371 application of PCT/IB2014/001367 having an international filing date of Jul. 23, 2014, which claims priority to Indian application No. 3303/CHE/2013 filed Jul. 25, 2013, the entire contents of which are incorporated herein by reference.

TECHNICAL FIELD

The present subject matter relates, in general, to radio opaque fibers, filaments and textile materials and in particular, to radio opaque fibers, filaments, and textile materials that are flexible and opaque to high energy radios waves.

BACKGROUND

High energy radio waves such as X-Rays and gamma rays have been increasingly used for various applications, because of their ability to penetrate various surfaces without getting reflected or absorbed. The penetration property of these radio waves makes them useful for medical diagnostic, and therapeutic purposes, and for scanning of baggage for detection of suspicious material, etc.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods, in accordance with embodiments of the present subject matter, are now described by way of example only, and with reference to the accompanying figures, in which:

FIG. 1 illustrates a cross section of an implementation of radio opaque filament, in accordance with an embodiment of the present subject matter.

FIG. 2 illustrates cross sections of various implementation of radio opaque filament, in accordance with an embodiment of the present subject matter.

FIG. 6 (a) and FIG. 6 (b) illustrates the structure of the radio opaque textile before and after dissolution as seen on an XRay image, in accordance with an embodiment of the present subject matter.

DETAILED DESCRIPTION

Figure 3:
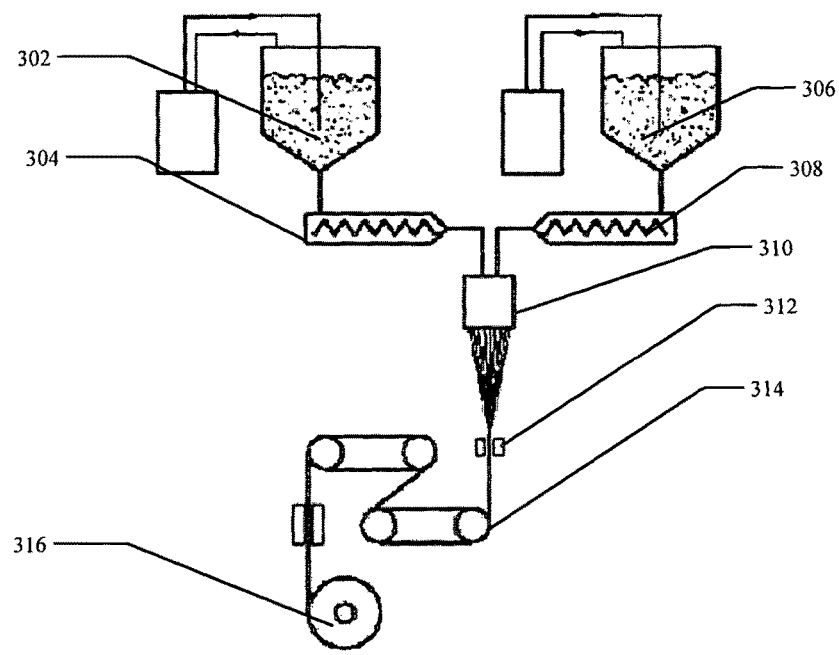
FIG. 3 illustrates a process for spinning a radio opaque fiber, in accordance with an embodiment of the present subject matter.

Fibers, filaments, and textiles for providing radio opacity are described herein. The radio opaque fibers, filaments, and textiles provide radio opacity for a large range of frequencies in the electromagnetic spectrum. The radio opaque fibers, filaments, and textiles disclosed herein are made using radio opaque materials in suitable particulate form, and are flexible, drapable, sewable, and washable. Further, the radio opaque textiles are suitable for making garments, gloves, radio masks, thyroid collars, etc. The garments made with these fibers, filaments and textiles are comparatively lightweight. Further, garments made of the material may be multilayered, where each layer of the multilayer may exhibit radio opacity for a different frequency range in the electromagnetic radio spectrum.

Radio waves, such as X-Rays, are commonly used in several medical applications, like diagnosis and therapeutics, and industrial applications like non-destructive testing to detect faults in components. The medical applications include studying bone structures and bone disorders in human beings The property that X-Rays penetrate the muscle mass, but bones are radio opaque render bone structures to be captured on X-Ray irradiation. During the X-Rays irradiation procedure, doctors, technicians, and support staff are unintentionally exposed to the radiation. They may also be unintentionally exposed to scattered radiation or radio waves reflected from other radio opaque surfaces during the X-Ray irradiation procedure, and may be of lesser intensity as compared to direct radiation. Further patients undergoing diagnostics and therapies may expose certain areas of the body which are not intended for radiation exposure. For example, a person for whom an X-Ray diagnostic of the shin bone is being done, may not desire to expose the femur to the X-Ray. The exposure to radiation is known to be damaging to human health and prolonged exposure may lead to health complications, including cancer. Similarly, Gamma rays are also used for industrial applications such as detecting faults in castings. Prolonged exposure to Gamma rays may also lead to health hazards.

In the following description, the term 'administrator' has been used to refer to people who are conducting the diagnostic test or using the X-Ray for performing a procedure. It may be appreciated that the administrator may be subject to a direct beam of X-Ray, or scattered radiation unintentionally. The term 'subject' has been used to refer to the patient undergoing the diagnosis, and object that is subject to diagnostic analysis in an industrial application. The term 'source' has been used to refer to the source emitting electromagnetic radiation, such as X-Rays or gamma rays. It may be appreciated that while the description is referring largely to X-Rays, the material described herein is opaque, in varying degrees to other frequencies of the electromagnetic spectrum as well.

For preventing or reducing such unintended exposure, conventionally, a radio opaque shield made of a lead plate that is substantially thick is used. The structural construction of the lead plate includes machined, cast or forged aluminum, brass or steel, upon which a layer of lead is dispersed. The lead plate is placed between the source and the administrator to shield the administrator from X-Ray incidence. The lead plate is also placed between the source and the subject to shield parts of the body of the subject that are not intended for diagnosis. However, these lead plates are heavy and non-flexible. Therefore moving and positioning the lead plate appropriately to ensure that the administrator and subject are sufficiently protected is a challenge. Additionally, exposure to lead of the lead plates by administrators is known to cause other health hazards. Further, the toxicity of lead poses a problem for manufacturers of the lead plate, because disposal of lead wastes that occurs during manufacturing, and also disposal of used and worn lead plates causes an environment threat.

In another conventional method, lead based radiation opaque aprons made from lead based radiation opaque materials are used for protection from X-Rays. To transform pure lead into a wearable radio opaque material, lead is mixed with binders and additives to make a flexible lead polyvinyl sheet. The lead based radiation opaque aprons are wearable. The use of the heavy element lead in polyvinyl sheets in the lead based radiation opaque apron also renders the apron inflexible, and hence does not drape around the contours of the body of the administrator and subjects to sufficiently protect from X-Rays as intended. Further, because of lack of flexibility, some of the lead based radiation opaque aprons also do not have sleeves. Using lead based radiation opaque materials for making gloves is also a challenge because of the lack of flexibility of the garment. Further, the material is not breathable because of use of polyvinyl sheet in the construction of the lead based radiation opaque apron.

The lead based radio opaque materials are not washable and autoclavable. The main reason being that they are too thick and essentially hold lead in powder form between layers of some suitable fabric. They are inflexible to a large degree and cannot be used in washing machines as part of regular laundry cycles. Further, some of the layers so used to hold the powder are made with sheets of materials that cannot withstand elevated temperatures and therefore deform and loose shape in autoclaving cycles. Hence, maintaining the sterility of the lead radiation opaque materials is a challenge. Further, because lead causes environmental hazards, recyclability of the lead based radio opaque materials is also a challenge.

Conventionally, non-lead radio opaque aprons are also used. However, non-lead based radio opaque aprons are transformed into a non-lead polyvinyl sheet. The use of the polyvinyl sheet renders the non-lead radio opaque aprons not breathable, and also inflexible. Multiple layers of the non-lead poly vinyl sheet are used for effective opacity from radiation, where the number of layers depends on the intensity of radiation that is incident on the non-lead radio opaque apron. The non-breathable property of the non-lead radio opaque polyvinyl sheets makes multiple layers even more uncomfortable for use over a long period of time. The inflexible property of the radio opaque polyvinyl sheet does not allow the apron to be draped.

Further, in conventional methods, scatter radiation may prove to be a challenge. Providing radiation technicians with a radio opaque apron with radio opacity similar to the apron worn by the administrator may be expensive, especially considering that several radiation technicians may be involved. Further, because of non-flexible property of the materials used for radio opaque aprons conventionally, movement and mobility for radiation technicians may be a challenge.

According to an embodiment of the present subject matter, radio opaque textiles made from radio opaque fibers and filaments, where the radio opaque textile so made is flexible is described herein. The radio opaque fabric is made by intermeshing of loops or interlooping of radio opaque yarns or intermeshing of radio opaque fibers or filaments. The yarns used for radio opaque fabric may be made of a continuous filament which may be multifilament or mono filament. Further the yarn may be made by spinning of the radio opaque fibers into a yarn on conventional spinning techniques like ring spinning or air Vortex technique etc The variations of the constituent yarns making the resulting textile may be combinations of different filament types, or a multi-component yarn or a core-spun yarn of fiber and filament assembly with radio opaque elements of atomic numbers greater than or equal to 29. The radio opaque material is made from radio opaque elements, alloys, or compounds thereof, and a first polymer to form a fiber or a filament with a unified structure. A carrier polymer is used to bind the plurality of unified structures together to provide spinnability. The carrier polymer binds a plurality of unified structures during the co-extrusion process to form a fiber or filament or yarn suitable for knitting, weaving or other non-woven textile manufacturing processes known in the art. The carrier polymer enables ease of the fiber, filament or fabric manufacturing process. The textiles thus manufactured from the radio opaque fiber or filament is flexible, breathable, washable, and can be stitched to form a garment. The first polymer may comprise an elastomer, providing elasticity to the radio opaque textile or a elastomeric yarn may be used in construction of flexible textile along with the radio opaque fiber or filaments.

In one implementation, a combination of two or more radio opaque elements of atomic numbers greater than or equal to 29 are chosen for ensuring appropriate shielding effect of the shielding fabric, while optimizing on the weight of the garment. In the given implementation, the cross section of the fiber or filament has multiple unified structures, where each unified structure comprises a combination of one or more radio opaque element and at least one polymer. The unified structure is obtained by a method called compounding in which radio opaque elements are dispersed in the first polymer. The multiple unified structures are co-extruded with a carrier polymer to form a radio opaque fiber or filament. This is further described with details in further paragraphs of this detailed description.

In one implementation, the radio opaque fabric is stitched into a radio opaque garment, which is flexible, lightweight, and breathable. Multiple layers of the radio opaque fabric may be provided for effective radio shielding, where the number of layers depends on the properties of the radiation, such as radiation intensity to be shielded from. The radio opaque garments can be draped over the radiation administrator to cover the contours of the body substantially to protect him from unintended exposure. The radiation subject may also be draped with the radio opaque textiles having apertures, where the apertures expose the parts of the subject that are intended for radiation diagnostics or therapeutics. Owing to the flexibility and drapability of the radio opaque garment, it can be stitched into a full sleeved shirt, or made into a glove, or any other garment shape, and thus substantially protects all parts of the body or the objects that are intended for protection.

The radio opaque fabric is washable, and hence dirt and other contaminants may be washed out of the radio opaque fabric. Additionally, the radio shield fabric can be sterilized in an autoclave for providing sterility. Sterility is specifically important for medical related applications.

The radio opaque fabric is also breathable, and hence a person using the radio opaque garment is comfortable even over prolonged used of the garment.

Further, owing to the plurality of radio opaque elements with atomic number greater than or equal to 29 used, radio opaque garments of varying weights and suited for varying intensity of radiations, such as direct X-Ray radiation or scattered X-Ray radiation can be made. The use of higher percentage by weight of the radio opaque material 104 to the first polymer 106 results is higher density and similarly the use of lower percentage by weight results in lower density. Radio opaque garments made with lower density radio opaque material may be used for shielding scattered radiation. Further, the radio active element may comprise lower range of atomic numbers greater than or equal to 29. In the cases of direct incidence of high intensity X-Ray radiation, higher density radio opaque garments that are made with higher percentage by weight of the radio opaque material 104 to the first polymer 106 may be used. Further multiple layers of the radio opaque fabric may be used for the radio opaque garment to make the radio opaque garment effective in shielding the high intensity radiation, such as gamma radiation. The grading of the layers can be such that the layer facing the incident radiation may be of higher atomic number combination and the subsequent layers are of lesser atomic number combinations. Therefore the radio opaque garment is optimized for the weight and degree of protection along with economic viability.

Thus, the present subject matter provides for effective radio opacity which is comparatively light weight, and flexible. The radio opaque fabric can also be stitched and shaped into any garment. The fiber or filament used for the radio opaque fabric may be a combination of multiple radio opaque elements, alloys, or compounds thereof providing adequate shielding, while optimizing weight of the garment. The garments may additionally have multiple layers for providing adequate shielding against the radiation.

While aspects of described radio opaque fabric can be used directly or as a secondary surface lining to other textiles, the implementations are described in the context of the following applications. The following description is to be construed as examples, but not to limit the scope of the present subject matter.

FIG. 1 illustrates a cross section of a radio opaque filament 100 in accordance to one implementation of the present subject matter. The radio opaque fiber and radio opaque filament are hereinafter commonly referred to as the filament 100.

The filament 100 comprises a plurality of matrix 102 and a carrier polymer 108, where the carrier polymer 108 is a base material for binding the plurality of matrix 102 to impart spinnability of the plurality of matrix 102 into a fiber or a filament. The weight ratio of the carrier polymer 108 to the weight of the first polymer 106 and the radio opaque material 104 may be varied from 20% to 80% of combined weight of the first polymer 106 and the radio opaque material 104. The matrix 102 is a unified structure and comprises radio opaque materials 104 and a first polymer 106. Unified structure in this context may be understood as a structure that is cohesively held together, and which does not disintegrate. The unified structure is achieved by dispersing radio opaque materials 104 in the first polymer 106. The radio opaque materials 104 is one of a radio opaque element, an alloy, a compound or a combination thereof of the radio opaque element, where the atomic number of the radio opaque element is greater than or equal to 29. In the following description, the radio opaque element of atomic number greater than or equal to 29 have been referred to as radio opaque elements for ease of explanation.

In one implementation, the radio opaque element used in the radio opaque material 104 include actinium, antimony, barium, bismuth, bromine, cadmium, cerium, cesium, gold, iodine, indium, iridium, lanthanum, mercury, molybdenum, osmium, platinum, polonium, rhenium, rhodium, silver, strontium, tantalum, tellurium, thallium, thorium, tin, tungsten, uranium, zirconium, and elements of lanthanide series except promethium.

In another implementation, the radio opaque material 104 is a radio opaque compound made from the radio opaque elements. The radio opaque compounds may be one of the form of the radio opaque metal oxide, carbonate, sulphate, halides especially fluoride and iodide, hydroxide, tungstate, carbide, sulphide, urinates and tellurides or metallic salts of organic acid, wherein organic acid is one of acetate, stearate, naphthenate, benzoate, formate, propionate, and other organotic and organolead compounds.

In one implementation, the matrix 102 is obtained by incorporating radio opaque material 104 in a particulate form into the polymer 106. In the given implementation, the radio opaque material 104 is of size distribution of range 0.05 micron to 100 microns, depending on the cross section diameter of the polymer matrix 102. The radio opaque material 104 is added in the polymer 106 as additives. The radio opaque material 104 is incorporated into the polymer 106 by a method referred to as compounding. In compounding, a molten mass of polymer 106 is taken and the required percentage of radio opaque material 104 is added along with some dispersing agents, for ensuring homogenous distribution of the radio opaque materials 104, and anticoagulants, for ensuring that during the compounding process, the mixture does not coagulate. In one implementation, after compounding, the compounded mixture is cooled and then made into pellet like structures. The pellets may be used in the process of extrusion into fibers as explained in FIG. 3.

It may be appreciated that the radio opacity of the filament 100 depends on the density of the radio opaque element in the radio opaque material 104 in the filament. The density of the radio opaque element may be measured by weight or volume of the radio opaque element in the filament 100 or as a ratio of the radio opaque element to the first polymer by weight or volume. However, with increasing the density of radio opaque element in the matrix 102, the matrix 102 loses its viscosity, flow, and shears strength, and therefore affects the spinnability of the element polymer matrix 106 into fine fibers. The preferable fineness of the fiber or filament is 20-40 microns. The finer fibers and filament render textiles made out of the finer fibers and filament softer, more flexible and drapable.

In one example, for radio opacity of the filament 100 to X-Rays, the ratio of the radio opaque material 104 by weight in the matrix 102 is in the range of 30 to 80% by weight. This ratio of weight of the radio opaque material in the filament 100 imparts different levels of radio opacity to X-Rays for the filament 100, Depending on the grade of shielding needed, this ratio by weight may be chosen within the range of 50% to 80%.

In one implementation, to retain the spinnability of the filament 100 comprising the minimum density of radio opaque material 104, the carrier polymer 108 is used which is compatible with the matrix 102. In the given implementation, the carrier polymer 108 is co-extruded with a plurality of matrix 102. In a cross section of the filament 100, the plurality of matrix 102 are dispersed in the carrier polymer 108. In the given implementation, the carrier polymer 108 imparts strength and protection to the matrix 102 for conversion to fine fiber and filament that are amenable for being made into flexible textiles.

In one implementation, after spinning the filament 100, and conversion of the filament 100 into radio opaque textile form, the filament 100 may be subject to post treatment to dissolve the carrier polymer 108. In one implementation the carrier polymer 108 is poly vinyl alcohol which is dissolved easily by mere hot washing of the textile material. In the given implementation, after the post treatment, the plurality of matrix 102 forms a unified structure. The plurality of matrix 102 may be intermingled or twisted together to form the unified structure.

In another implementation, a plurality of the filament 100 is made into radio opaque fabric by one of knitting, weaving, or non-woven fabric manufacturing technique or combination of these techniques thereof. In one implementation, the radio opaque fabric thus obtained may be subjected to post treatment. The post treatment for the fabric may be treating the fabric with solvent which acts as medium of dissolution for the carrier polymer 108 without affecting the radio opaque textile. Formic acid may be used as a solvent for the carrier polymer 108 which is nylon. Hot water may be used as a solvent when the carrier polymer 108 is polyvinyl alcohol. The post treated radio opaque fabric obtained thus is more flexible, radio opaque, sewable, breathable, and light weight. Appropriate usage of elastomer yarns in construction of the textile, as said above, will impart the stretchability to the textile and increase the cover factor of fabric making it denser and obstructing the incident photons of the incident radiation beam. The post treated radio opaque fabric may be used to make protective aprons, thyroid collars, protective gloves, separation screens, protective caps, male gonadial shields, female gonadial shields, diapers, breast shields, scoliosis flexible textiles, and protective eye shields. The radio opaque fabric may also be used as liners or composites for protection of sensitive electronic gadgets and circuits, film markers, and transport protection of radionuclide materials. The filament 100 and the post treated fabric for radio opacity of XRays and Gamma rays.

FIGS. 2(a)(1) and 2(a)(2), 2(b)(1) and 2(b) (2), 2(c) (1) and 2(c) (2), 2(d) (1) and 2(d) (2), 2(e) (1) and 2(e) (2), 2(f) (1) and 2(f) (2), 2(g) (1) and 2(g) (2), 2(h) (1), and 2(h) (2) disclose various cross sections of the filament 100. The cross section geometries are achieved by a co-extrusion process. It may be appreciated that the cross sections displayed herein are illustrative and not exhaustive. Various other cross sections or combinations may be used. The specific cross section may be determined based on the flexibility, utility, texture, and ease of handling of the fiber and filament. Each of the FIGS. 2(a) (1), 2(b) (1), . . . , 2(h) (1) illustrate the filament 100 before being subject to post treatment. In one implementation, the filament 100 is subject to post treatment for dissolving the carrier polymer 108. Each of the FIGS. 2(a)(2), 2(b)(2), . . . , 2(h)(2) illustrate the treated filament 202 after being subject to the post treatment for dissolving of the carrier polymer 108.

It may be appreciated that textiles made from fibers of each cross sections 2(a)(1) to 2(h)(1) may each have a specific textural properties. For example, a trilobal cross section imparts a silk texture to a textile manufactured from the trilobal fiber. Further, a bean shape cross section imparts cotton like texture to the textile. Thus, the selection of cross sections of the fiber may impart drapability to the textile.

In yet another implementation, the filament 100 is converted to a textile, and then subject to post treatment. In such an implementation, the textile that is subject to post treatment then comprises a plurality of treated filament 200, forming the fabric.

FIG. 2(a) (1) illustrates the filament 100 comprising a plurality of polymer element matrix 102 dispersed in the carrier polymer 108. As indicated in the figure, each of matrix 102 is a unified structure and comprises the radio opaque material 104 and the first polymer 106, both in circular form.

FIG. 2(a) (2) illustrates a treated filament 200 that has been subject to post treatment for dissolving of carrier polymer 108. A plurality of matrix 102 forms the treated filament 200. In one example, the longitudinal section of the plurality of the matrix 102 is intermingled or twisted to form the treated filament 200.

While, FIGS. 2(a)(1) and 2(a)(2) illustrate for circular cross sections of matrix 102, FIGS. 2(b)(1), and 2(b)(2) illustrate a cross section other than circular.

FIG. 2(c) (1) illustrates filament 100 of matrix 102 in the form of co-concentric triangles and encapsulated in the carrier polymer 108. In an example each of the co-concentric triangles 202, 204, and 206 are of similar composition of the matrix 102, but wherein the percentage and composition of radio opaque material 104 in the matrix 102 of each of the co-concentric triangles 202, 204, and 206 may be different. In the given example, the composition of radio opaque material is of higher atomic number in the co-concentric triangle 206 than in the co-concentric triangle 104.204 and which in turn is more than the percentage of radio opaque material 104 in 202 in the inner most triangle. percentage of radio opaque material 104 in the co-concentric triangle 206 is less higher than the percentage of radio opaque material 104 in the inner most triangle.

In yet another example, the composition of the matrix 102 of each of the co-concentric triangles 202, 204, and 206 comprises radio opaque material 104 different atomic number ranges. The outer most co-concentric triangle 206 has radio opaque material 104 comprising radio opaque element of higher atomic number, as compared to the inner and adjacent co-concentric triangle 204. Further the co-concentric triangle 204 has radio opaque material 104 comprising radio opaque element of higher number, as compared to the inner and adjacent co-concentric triangle 202.

FIG. 2(c) (2) illustrates the treated filament 200. As explained above, the longitudinal section of the plurality of the matrix 102 are intermingled or twisted to form the treated filament 200.

While, FIGS. 2(c)(1) and 2(c)(2) illustrate for triangular cross sectional structures of the matrix 102 and carrier polymer 108, FIG. 2(d)(1) illustrate a cross section that is other than triangular. FIG. 2(d) (2) illustrate a longitudinal view of the co-concentric structures, where all the layers of the co-concentricity is illustrated.

2(e) (1), 2(e) (2), and 2(e) (3) illustrate cross sectional structures wherein more than one of concentric outer layers comprises carrier polymer 108. It may be understood that the original structure 2(e) (1) is made with multiple layers of carrier polymer 108 to enable spinnability of the filament 100 containing high density radio opaque materials 104 in the matrix 102.

FIG. 2(e) (2) one layer of the outermost concentric layer of the carrier polymer 108 is dissolved. While, in 2(e) (3), multiple layers of the carrier polymer 108 are dissolved. It may be noted that in such structures the dissolution is limited to the carrier polymer 108.

FIG. 2(f) (1) illustrates the filament 100 obtained from a multi component arrangement, where a layer is of the matrix 102 and the adjacent layer is of the carrier polymer 108. In one implementation, the layer of the matrix 102 and the carrier polymer 108 are arranged in the form of a circle, where the matrix 102 may be arranged as a sector of the circle, and the adjacent carrier polymer 108 forms an adjacent sector of the circle. This arrangement of adjacent sector of the matrix 102, and the carrier polymer 108 may be repeated to form a circle.

FIG. 2(f) (2) illustrates the treated filament 200. In the treated filament 200, the sectors of matrix 102 are retained and interconnected, and the carrier polymer 108 is dissolved.

FIG. 2(g)(1) illustrates the filament 100 obtained form a multi component arrangement where a layer of matrix 102 and the adjacent layer of the carrier polymer 108 are arranged in the form of segments of a circle. FIG. 2(g) (2) illustrates the treated filament 200 after dissolution of the segments comprising the carrier polymer 108.

FIG. 2(h) (1) illustrates a bean shaped cross section of the filament 100. As indicated in the figure, matrix 102 is a unified structure, with carrier polymer 108 as the adjacent layer. FIG. 2(h)(2) illustrates a bean shaped cross section of the treated filament 200 after dissolution of carrier polymer 108.

FIG. 2(a) (2) illustrates a treated filament 200 that has been subject to post treatment for dissolving of carrier polymer 108. A plurality of matrix 102 forms the treated filament 200. In one example, the longitudinal section of the plurality of the matrix 102 is intermingled or twisted to form the treated filament 200.

FIG. 3 illustrates a process of using twin extruders for spinning a filament comprising different polymers. The process described herein utilizes a first extruder 304 which receives the matrix 102 from a first feeder container 302. In an implementation, molten mass of the matrix 102, which has been formed by compounding as explained earlier, is filled in the first feeder container 302.

A second extruder 308 receives a molten mass of the carrier polymer 108 from a second feeder container 306. In one implementation, the carrier polymer 108 is homogenized and fed into second feeder container 306. In the given process, each of the first extruder 304 and second extruder 308 may be operated at different pressure and temperature conditions. The percentage of each of the matrix 102 and the carrier polymer 108 in the filament 100 is determined by the profile in the spinneret and the relative throughput from each of the first extruder 302 and second extruder 304. Further, the size of filter has to prevent the spinneret from getting clogged.

Table 1 illustrates an example of the combination of additives used in the master batch for producing the polymer matrix 102. In one implementation, the polymer matrix 102 is extruded from the first extruder 302, explained above. It may be appreciated that the specific combination shown in FIG. 3(a) is only illustrative and not exhaustive. Various combinations and percentages of additives may be used, wherein the combination and percentages of each additive may be depending on the utility of the textile manufactured from the filament 100 comprising the element polymer matrix 102. For example, factors like the radio opacity of the fabric, the property to drape the fabric, the weight of the fabric may all depend on the specific utility of the textile. For example, if the textile is used as an apron for a doctor in a diagnostic application, the radio opacity expected of the fabric may be for a specific range of frequency of direct radiation, therefore the combination matrix 102 with combination an percentage of additives as depicted in Table 1 may be used, Whereas a textile used for shielding of a fabricated product may comprise other radio opaque materials 104 of different atomic numbers. Further the proportion of radio opaque materials 104 to the first polymer 106 may also be different as compared to percentages shown in Table 1

Figure 4:
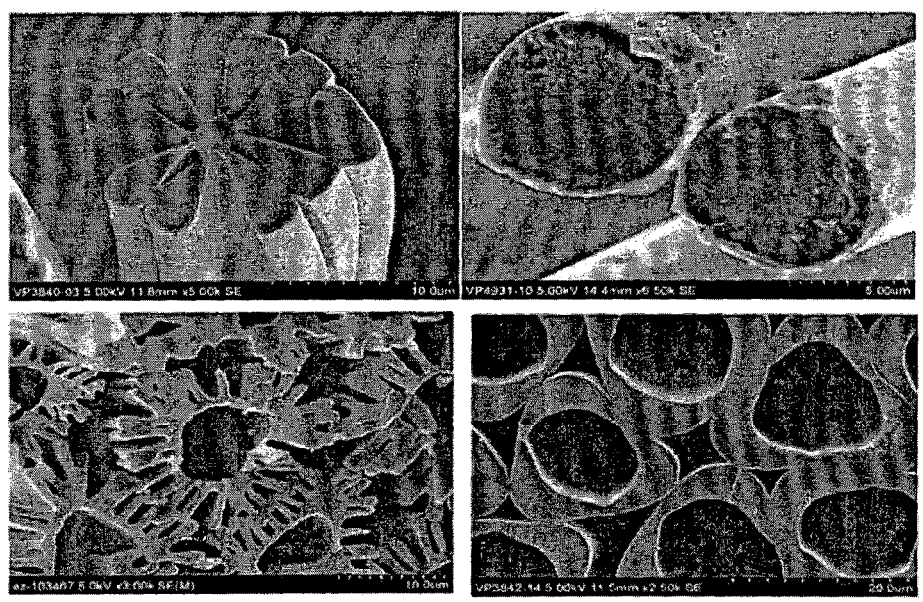
FIG. 4 illustrates various microscopic views of cross sections of the radio opaque filament, in accordance with an embodiment of the present subject matter.

FIG. 4 illustrates various cross sections of the filament 100 as viewed in a microscope, in accordance with an embodiment of the present subject matter.

As depicted in the Table 1, the master batch contains Barium sulphate of 15.4% by weight of material as the first part of the radio opaque material 104 in the master batch, bismuth oxide amounting of 54.6% of weight of the second part of the radio opaque material 104 in the master batch and polypropylene as the first polymer 106 amounting to 30% by weight of material in the master batch. The density of the matrix 102 obtained from the above components is of density 1.92 gm/cc. The master batch forms the matrix 102 fed into the first feeder container 302 in FIG. 3.

TABLE 1

Master batch

MASTER BATCH

| Sl No | Material | Percentage of material by weight |
|---|---|---|
| 1 | Polypropylene | 30% |
| 2 | Barium Sulphate | 15.40% |
| 3 | Bismuth Oxide | 54.60% |

Table 2 illustrates composition of a yarn comprising the master batch as detailed in Table 1, and the carrier polymer 108. In this case the carrier polymer 108 is nylon. The carrier polymer 108 is held in the second carrier container 306 for being fed into the second extruder 308 as explained in FIG. 3. As shown in the table, the percentage by weight of the carrier polymer 108 is 51%, while the percentage by weight of the master batch is 49%.

TABLE 2

Yarn

YARN

| Sl No | Material | Percentage of material by weight |
|---|---|---|
| 1 | Nylon | 51% |
| 2 | Master Batch | 49% |

Table 3 depicts the proportions of the elements in the yarn. The carrier polymer 108 forms 51% by weight of the filament. The polypropylene, which forms the first polymer 106 of the matrix 102, forms 14.7% of the weight of the filament 100. The Barium sulphate, which forms a component of the radio opaque element 104 of the radio opaque material 104, is 7.55% of the weight of the filament, and bismuth oxide, which is another component of the radio opaque element of the radio opaque material, is 26.75% of the weight of the filament.

The yarn thus formed is referred to as bi-component yarn indicating inclusion of two components, namely the carrier polymer 108, and the matrix 102. The number of filaments in the bi-component yarn is 72. The denier of the bi-component yarn thus produced is 396.

TABLE 3

Percentage weight of components in filament
YARN DETAIL

| Sr. No | Material | Percentage of Volume Fraction | Percentage of weight Fraction |
|---|---|---|---|
| 1 | B27PA6 (Nylon) | 73.30% | 51.00% |
| 2 | Polypropylene | 26.70% | 14.70% |
| 3 | Barium Sulphate | | 7.55% |
| 4 | Bismuth Oxide | | 26.75% |
| | No of Filament | | 72 |
| | Denier of the yarn | | 396 |

Radio opaque textile is made from a plurality of the filament 100 by means of plain weave on a rapier weaving machine with the following specifications:

Warp yarn: bi-component yarn 396/72 D
Weft yarn: bi-component yarn 396/72 D along with 70 D polyurethane yarn
Warp Drawing: 3 yarns in a dent
Weave: Plain one up one down
Warp density: 40 end per inch
Weft Density: 60 picks per inch
Relaxed GSM of fabric: 399

The textile realized from the method explained above had a thickness of 0.69 mm as measured in two plate method. [IS 7702:2012/ISO 5084:1996]

The textiles thus made are subjected to radio opacity tests for attenuation of incident X-ray at various Kvp ranges of accelerating potential on a testing machine. The results of the tests conducted are compared to radio opacity metrics of a lead apron of 0.5 mm thickness, which is used as a standard for measurement of radio opacity. Multiple layers of the textile are used for testing purposes. It may be noted, that as mentioned above, garments and other applications of radio opacity may also use multiple layers based on the X-Ray emission.

The testing machines used for the purpose of conducting the tests mentioned has the following specification Machine used Toshiba with Rotanode E7252 X
Stable output high frequency x-ray machine
Voltage divider: for invasive kV measurement
RaySafe Xi quality assurance tool set of kV and dose measurements at the delivery side from the tube
TOR IQII tool set for ensuring the beam alignment
Controlled ambience laboratory: temperature maintained at 24° C.+/−2° C.

The results of the tests conducted are detailed in Table 4

Table 5 depicts the comparative tests of radio opaque textile made from a plurality of the filament 100, where the textile is obtained by means of plain weaving. The textile thus obtained is subjected to post treatment by dissolution in formic acid. The treated fabric thus comprises only the masterbatch matrix along with the Polyurethane yarn. The resultant textile becomes 194/72 D in the textile composed only of the masterbatch polymer matrix. The constituents in the treated textile comprises the following components by weight of the treated textile:

Polypropylene: 30%
Barium Sulphate: 15%
Bismuth Oxide: 55%

The post-treated fabric has the following specifications:

Warp density: 84 end per inch
Weft Density: 72 picks per inch
Relaxed GSM of fabric 394.
Percentage of elastomeric yarn in fabric structure is 2%
Fabric thickness as measured by two plate method: 0.64 mm The post treated textiles are subjected to radio opacity tests and compared to radio opacity metrics of a lead apron of 0.5 mm thickness, which is used as a standard for testing radio opacity. Tests for measuring the radio opacity of the textile for X-Rays generated at different voltages may be noted, that as mentioned above, garments and other applications of radio opacity may also use multiple layers based on the X-Ray emission.

TABLE 4

Test reports of textiles formed from filament comprising carrier polymer

| | No of Layer | | | | | | | | Commercial |
| --- | --- | --- | --- | --- | --- | --- | --- | --- | --- |
| | Layer 1 | Layer 2 | Layer 3 | Layer 4 | Layer 5 | Layer 6 | Layer 7 | Layer 8 | Apron |
| Thickness | | | | | | | | | 0.5 |
| Set kV | | | | | | | | | |
| 40 | 37.6 | 62.3 | 72.7 | 81.7 | 88.9 | 92.2 | 94.2 | 96.1 | 100 |
| 45 | 34.9 | 58.3 | 68.5 | 77.8 | 85.7 | 89.5 | 92 | 94.4 | 100 |
| 50 | 32.7 | 55.6 | 65.8 | 74.8 | 83.2 | 87.3 | 90.1 | 92.8 | 100 |
| 55 | 31.4 | 53.4 | 63.3 | 72.2 | 80.8 | 85.2 | 88.2 | 91.2 | 100 |
| 60 | 29.8 | 50.9 | 60.7 | 69.3 | 78.2 | 82.8 | 85.9 | 89.2 | 99.9 |
| 65 | 27.6 | 48.3 | 57.3 | 66.1 | 75.1 | 79.8 | 83.1 | 86.7 | 99.4 |
| 70 | 26.6 | 46.4 | 55.5 | 63.8 | 73.1 | 77.8 | 81.2 | 84.9 | 99.1 |
| 75 | 25.5 | 44.7 | 53.5 | 61.9 | 70.6 | 75.7 | 78.1 | 83 | 98.7 |
| 80 | 24.7 | 42.9 | 51.5 | 59.8 | 68.4 | 73.4 | 76 | 81 | 98.1 |
| 85 | 23.6 | 40.9 | 48.7 | 57 | 65.8 | 70.8 | 73.5 | 78.5 | 97.3 |
| 90 | 22.6 | 39.7 | 47.5 | 55.4 | 64.2 | 69 | 71.8 | 76.7 | 96.7 |
| 95 | 21.5 | 37.7 | 45.2 | 53 | 61.5 | 66.5 | 69.3 | 74.3 | 95.9 |
| 100 | 21.1 | 37 | 44.2 | 51.8 | 60.3 | 65.2 | 68.1 | 73.3 | 95.6 |
| 125 | 17.5 | 32 | 38.2 | 45.7 | 53.6 | 58.8 | 61.9 | 67.5 | 93.4 |
| 150 | 15.2 | 28.1 | 33.2 | 40.1 | 48 | 52.7 | 56.2 | 61.7 | 91.5 |

TABLE 5

Radio opacity of textiles subject to post treatment

No of Layer

| | Layer 1 | Layer 2 | Layer 3 | Layer 4 | Layer 5 | Layer 6 | Layer 7 | Layer 8 | Lead Apron |
|---|---|---|---|---|---|---|---|---|---|
| Thickness (mm) | | | | | | | | | 0.5 |
| Set kV | | | | | | | | | |
| 40 | 44.5 | 68.4 | 79.8 | 87.4 | 91.9 | 94.5 | 96.1 | 97.4 | 100 |
| 45 | 41.1 | 64.3 | 76.3 | 84.3 | 89.4 | 92.5 | 94.5 | 96.1 | 100 |
| 50 | 38.6 | 61.4 | 73.3 | 81.9 | 87.2 | 90.6 | 92.9 | 94.8 | 100 |
| 55 | 36.7 | 59 | 70.7 | 79.4 | 85 | 88.8 | 91.3 | 93.4 | 100 |
| 60 | 35.3 | 56.5 | 68.1 | 77 | 82.6 | 86.7 | 89.3 | 88.4 | 99.9 |
| 65 | 32.8 | 53.7 | 64.9 | 74 | 79.9 | 84 | 86.8 | 89.5 | 99.4 |
| 70 | 30.1 | 50.7 | 62.1 | 71.5 | 77.3 | 81.6 | 84.8 | 87.4 | 99.1 |
| 75 | 29.7 | 49.9 | 61 | 69.9 | 75.7 | 80.2 | 83.2 | 85.9 | 98.7 |
| 80 | 28.7 | 48.3 | 58.6 | 67.7 | 73.5 | 78.1 | 81.2 | 83.8 | 98.1 |
| 85 | 27.5 | 46.3 | 56.1 | 65.2 | 71.1 | 75.7 | 78.9 | 81.7 | 97.3 |
| 90 | 26.7 | 44.8 | 54.1 | 63.5 | 69.7 | 73.9 | 77.3 | 80.2 | 96.7 |
| 95 | 24.8 | 41.9 | 52.8 | 60.9 | 59.3 | 71.4 | 74.7 | 78 | 95.9 |
| 100 | 24.3 | 410 | 51.5 | 59.8 | 65.6 | 70.3 | 73.7 | 76.8 | 95.6 |
| 125 | 24.1 | 40.9 | 50.2 | 58.2 | 64.3 | 69.1 | 71.5 | 75.3 | 93.4 |
| 150 | 23.9 | 40.1 | 49.1 | 57.9 | 63.9 | 68.7 | 70.9 | 74.1 | 91.5 |

It may be observed from a comparison of Table 4 and Table 5, that radio opacity of textiles formed from filament 100 that are subject to post treatment as illustrated in Table 5 display better radio opacity as compared to the corresponding textile formed from filament 100, where the carrier polymer 108 is retained.

FIG. 5 illustrates testing the effect of using multiple layers of the radio opaque textile, in accordance with one implementation. In this illustration, a metallic coin is used as a subject, which is placed between an radiation source and a X-Ray film. A plurality of radio opaque textile layers is placed between the radiation source and the subject to test the radio opacity of varying number of layers of the radio opaque textile. The radio opaque textile used for the test herein has been described in conjunction with Table 5.

Figures 5A, 5B, 5C:
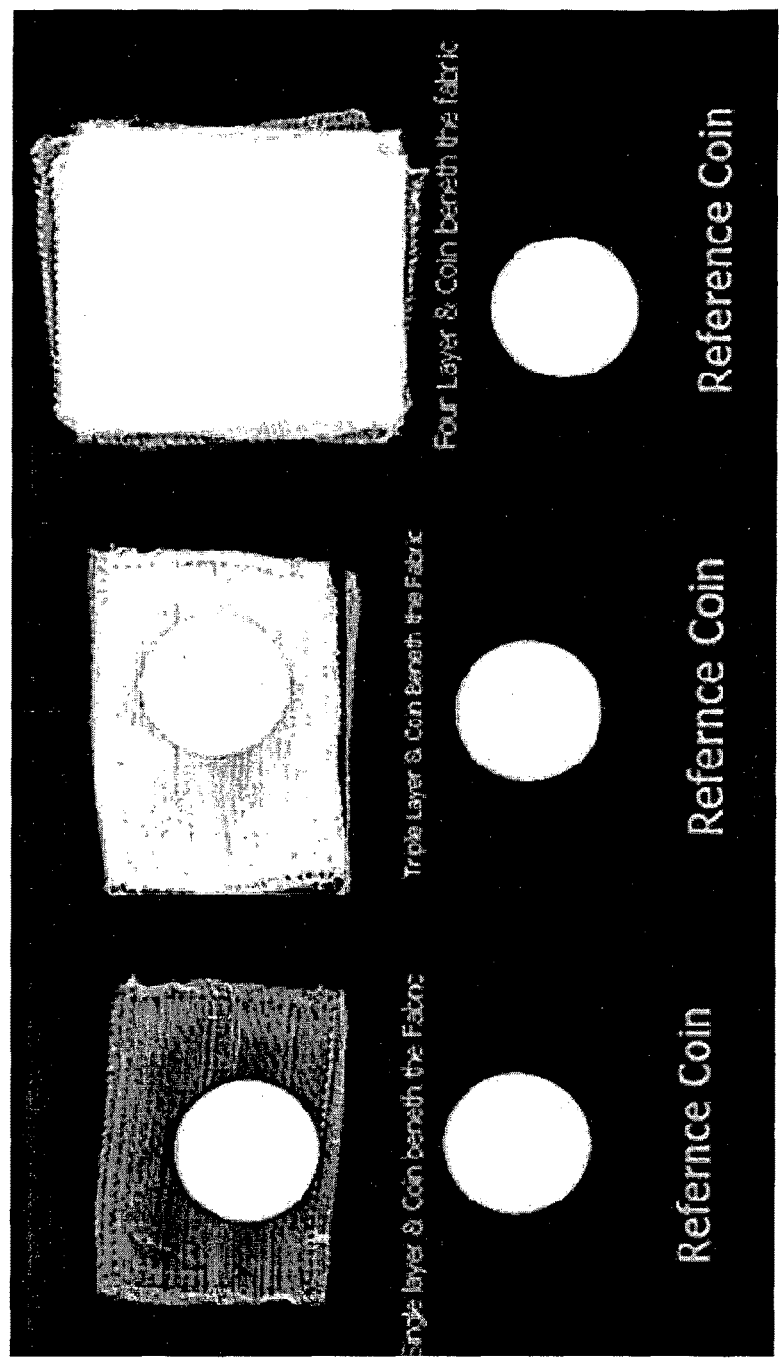
FIG. 5 (a), FIG. 5 (b), and FIG. 5(c) illustrate a test of radio opacity with a plurality of radio opaque textiles, in accordance with an embodiment of the present subject matter.

In FIG. 5(a), one layer of radio opaque textile is used for testing radio opacity by placing the radio opaque textile between the subject and the radiation source. In FIG. 5(b), three layers of radio opaque textile are placed between the radiation source and the metallic coin. In FIG. 5(c) four layer of radio opaque textiles are placed between the subject and the X-Ray source. As can be observed, four layers of radio opaque textile provide 100% radio opacity, the radio opacity illustrated with single layer of radio opaque textile shows the least radio opacity.

FIG. 6(a) illustrates the structure of a radio opaque textile. The structure, in the given implementation, has been illustrated by taking an X-Ray image of a radio opaque textile formed using filament 100. The radio opaque textile used has been described in conjunction to Table 4. For the purposes of conducting the test two layers of radio opaque textile have been placed, wherein each layer is crisscrossed with respect to the other. The radiation source was set at 40 KV for the test. From FIG. 6(a), it may be observed that the structure of the radio opaque textile is visible as a mesh of yarns. The visibility of mesh of yarns may be explained by the presence of radio transparent areas in the radio opaque textile caused by the second polymer 108, wherein the X-Ray radiation passes through these radio transparent areas, although the core comprising of 106 containing the radio opaque material 104 are opaque to the radiation, and hence the pass through radiation is captured on the X-Ray film.

FIG. 6(b) illustrates the structure of the radio opaque textile subjected to post treatment for dissolution of carrier polymer 108. The structure, in the given implementation, has been illustrated by taking an X-Ray image of a radio opaque textile formed using treated filament 200. The radio opaque textile used has been described in conjunction to Table 5. For the purposes of conducting the test, two layers of radio opaque textile have been placed, wherein each layer is crisscrossed with respect to the other. The radiation source was set at 40 KV for the test. It may be observed from FIG. 6(b), that the radio opaque textile has been captured in its entirety, and the mesh of yarns is not visible. The lack of visibility of the mesh structure may be explained by the dissolution of the carrier polymer 108 from the radio opaque textile, causing the radio transparent areas of the textile to diminish, and therefore, the radio opaque textile displays increased opacity to the radiation source. It may be observed from FIG. 6(a) and FIG. 6(b) that the radio opaque textile that is subjected to post treatment and formed from treated filament 200 displays better radio opacity as compared to the radio opaque textile formed from filament 100.

We claim:

1. A radio opaque textile comprising:
a plurality of layers, each of the plurality of layers comprising:
a plurality of treated radio opaque filaments, wherein each of the treated radio opaque filaments comprises:
a matrix, wherein the matrix comprises at least a radio opaque material, wherein the radio opaque material is at least one of a radio opaque element, an alloy of the radio opaque element, a compound of the radio opaque element, or a combination thereof, wherein the radio opaque element is of an atomic number greater than or equal to 29; and
an elastomer, wherein elastomer and the plurality of treated radio opaque filaments are made into the radio opaque textile, wherein the elastomer diminishes radio transparent areas between the treated radio opaque filaments;
wherein a fineness of each of the treated radio opaque filaments is in a range of 20-40 microns, and wherein the radio opaque material is in a range of 50-80% by weight of each of the treated radio opaque filaments.

2. The radio opaque textile of claim 1, wherein the elastomer is a first polymer comprising the radio opaque material dispersed in it to form the matrix.

3. The radio opaque textile of claim 2, wherein the radio opaque material and the first polymer form a unified flexible structure.

4. The radio opaque textile of claim 1, wherein the elastomer is a plurality of elastomeric yarns.

5. The radio opaque textile of claim 4, wherein the plurality of elastomeric yarns and a plurality of radio opaque filaments are made into an untreated radio opaque textile by one of knitting, weaving, non-woven techniques, or a combination thereof for forming the radio opaque textile.

6. The radio opaque textile of claim 1, wherein the radio opaque element is at least one of actinium, antimony, barium, bismuth, bromine, cadmium, cerium, cesium, gold, iodine, indium, iridium, lanthanum, lead, mercury, molybdenum, osmium, platinum, pollonium, rhenium, rhodium, silver, strontium, tantalum, tellurium, thallium, thorium, tin, tungsten, uranium and zirconium, or elements of lanthanide series except promethium.

7. The radio opaque textile of claim 1, wherein the compounds of the radio opaque elements are in the form of oxides, carbonates, sulphates, fluorides, iodides, hydroxides, tungstates, carbides, sulphides, uranates, and tellurides or metallic salts of organic acids, wherein organic acids is one of acetates, stearates, naphthenates, benzoates, formates, and propionates.

8. The radio opaque textile of claim 1, wherein each of the treated radio opaque filament has a plurality of concentric layers, wherein each of the plurality of concentric layers has a polygonal cross section, wherein the polygonal cross section is one of square, rectangle, triangle, hexagon, octagon, nonagon, decagon, and other non-specific geometric cross section shape.

9. The radio opaque textile of claim 8, wherein the radio opaque element of the radio opaque material of an inner concentric layer of the plurality of concentric layers is of an atomic number lesser than the radio opaque material of an outer concentric layer.

10. The radio opaque textile of claim 8, wherein percentage of the radio opaque material in an inner concentric layer of the plurality of concentric layers is lesser than a percentage of the radio opaque material of an outer concentric layer.

11. The radio opaque textile of claim 1, wherein the radio opaque textile is porous to moisture and permeable to air.

12. A process for making a radio opaque textile, the process comprising:
(a) providing a plurality of radio opaque filaments, wherein each of the plurality of radio opaque filaments comprises:
a matrix, wherein the matrix comprises at least a radio opaque material and a first polymer, wherein the radio opaque material is at least one of a radio opaque element, an alloy of the radio opaque element and a compound of the radio opaque element, or a combination thereof, wherein an atomic number of the radio opaque element is one of greater than and equal to 29, and wherein the matrix and the first polymer form a unified flexible structure; and
a carrier polymer, wherein the carrier polymer binds to a plurality of matrix and is co-extruded with the matrix;
(b) providing a plurality of elastomeric yarns;
(c) making the plurality of radio opaque filaments and the plurality of elastomeric yarns into an untreated radio opaque textile by at least one of knitting, weaving, nonwoven textile manufacturing technique, or a combination thereof; and
(d) treating the untreated radio opaque textile with a solvent to dissolve the carrier polymer, to form the radio opaque textile, wherein dissolution of the carrier polymer results in diminished radio transparent areas in the radio opaque textile as compared to the untreated radio opaque textile.

13. The process of claim 12, wherein each of the first polymer and the carrier polymer is at least one regenerated polymer or synthetic polymers which is one of polyester, acrylic, poly amide, regenerated cellulose, polyacylonitriles, polytriphenylene terepthalate, polybutyleneterepthalate, polylactic acid, aramides, metaaramides, nylon 6, nylon 6,6, polypropylene, polyethylene, polyurethane, polymers of isoprene regenerated cellulose.

14. The process of claim 12, wherein dissolution increases a thread density of the untreated radio opaque textile by at least two times.

15. The process of claim 12, wherein each of the plurality of radio opaque filaments has a plurality of concentric layers, wherein each of the plurality of concentric layers has a polygonal cross section, wherein the polygonal cross section is one of square, rectangle, triangle, hexagon, octagon, nonagon, decagon, and other non-specific geometric cross section shape.

* * * * *